United States Patent
Tam et al.

(10) Patent No.: US 8,490,821 B2
(45) Date of Patent: Jul. 23, 2013

(54) APPARATUS FOR SEPARATELY CONTAINING DIFFERENT FLUIDS

(75) Inventors: Dennis Tam, Macungie, PA (US); Michael B. Stout, Allentown, PA (US)

(73) Assignee: Mack Trucks, Inc., Greensboro, NC (US)

( * ) Notice: Subject to any disclaimer, the term of this patent is extended or adjusted under 35 U.S.C. 154(b) by 316 days.

(21) Appl. No.: 12/988,560

(22) PCT Filed: May 28, 2008

(86) PCT No.: PCT/US2008/006747
§ 371 (c)(1),
(2), (4) Date: Oct. 19, 2010

(87) PCT Pub. No.: WO2009/131561
PCT Pub. Date: Oct. 29, 2009

(65) Prior Publication Data
US 2011/0036847 A1  Feb. 17, 2011

Related U.S. Application Data

(60) Provisional application No. 61/124,915, filed on Apr. 21, 2008.

(51) Int. Cl.
*B65D 51/18* (2006.01)
(52) U.S. Cl.
USPC ........ 220/564; 220/4.01; 220/4.12; 220/4.14; 220/4.25; 220/4.27; 220/501; 220/505; 220/524; 220/555; 220/567.2

(58) Field of Classification Search
USPC ............ 220/524, 555, 564, 567.2, 4.01, 4.12, 220/4.14, 4.25, 4.27, 501, 505
See application file for complete search history.

(56) References Cited

U.S. PATENT DOCUMENTS

| 5,547,096 A | 8/1996 | Kleyn |
| 6,223,526 B1 | 5/2001 | Wissler |
| 6,938,793 B2 * | 9/2005 | Lerner ...................... 220/574.2 |
| 2006/0255080 A1 | 11/2006 | Engelen |

FOREIGN PATENT DOCUMENTS

| EP | 1736350 A2 | 12/2006 |
| FR | 2671542 | 7/1992 |
| WO | 2008034333 | 3/2008 |
| WO | WO2008034333 | * 3/2008 |

OTHER PUBLICATIONS

Supplementary European Search Report for corresponding EP application No. 08767912.2.

* cited by examiner

*Primary Examiner* — Anthony Stashick
*Assistant Examiner* — Elizabeth Volz
(74) *Attorney, Agent, or Firm* — Martin Farrell; Michael Pruden

(57) ABSTRACT

An apparatus for separately containing fuel and an exhaust gas treatment fluid on a vehicle, such as an SCR reductant, includes a fuel tank having a perimeter wall and at least one end wall defining an internal space for containing fuel, a portion of the perimeter wall extending beyond the at least one end wall to form a rim defining with the at least one end wall a recess, and, a second vessel for containing the reductant or other treatment fluid having a shape conforming to the recess, the second vessel being supported in the recess.

11 Claims, 2 Drawing Sheets

APPARATUS FOR SEPARATELY CONTAINING DIFFERENT FLUIDS

FIELD OF THE INVENTION

The invention relates to containers for more than one fluid, and more particularly, to a container apparatus in which a first container includes a support for a second container.

BACKGROUND AND SUMMARY OF THE INVENTION

Vehicles have fuel tanks and other containers for fluids that are consumed by the vehicle for various functions. Recent changes in exhaust emission regulations, particularly in reducing NOx emissions, are leading to the use of substances that are injected into the exhaust flow as part of an aftertreatment process. One such process involves injecting urea or a similar substance into the exhaust flow, which, when in the presence of a catalyst, converts NOx to nitrogen and oxygen. Urea is typically stored as a liquid and must be carried in a tank or other vessel.

Finding space on a vehicle chassis for an additional fluid vessel is difficult.

The invention provides an apparatus for storing different fluids that minimizes the space required and conveniently provides access to both fluid containers for filing and drawing fluids therefrom.

An apparatus according to the invention for separately containing different fluids, comprises a first vessel having a perimeter wall and at least one end wall defining an internal space, a portion of the perimeter wall extending beyond the at least one end wall to form a rim defining with the at least one end wall a recess, and, a second vessel having a shape conforming to the recess, wherein the second vessel is supported in the recess.

According to the invention, the second vessel is fully inserted in the recess. Alternatively, the second vessel is partly contained in the recess.

The first vessel may be a fuel tank, and may be modified from one of the known cylindrical fuel tank shapes, for example, a D profiled tank, a rectangular or square tank, or a circular cylindrical tank.

According to another aspect of the invention, the first vessel and the second vessel are complementarily shaped to provide for mutual orientation of the vessels. The second vessel may, for example, have a D profile to mate with a D profile recess formed by the first vessel.

According to another aspect of the invention, there is provided at least one device for removably securing the second vessel in the recess.

According to another aspect of the invention, the second vessel further comprises at least one component for accessing an interior of the second vessel, such as a fill neck and draw tube neck, and wherein the portion of the perimeter wall of the first vessel is shaped to receive the at least one component. The perimeter wall may include slots or gaps to receive the fill neck or draw tube neck, for example.

According to yet another aspect of the invention, the perimeter wall and second vessel may include indexing elements to ensure correct orientation of the second vessel relative to the first vessel. Such indexing elements are advantageous for vessels that are peripherally symmetrical. The indexing elements may be a slot formed in the perimeter wall and the accessing components provided on the second vessel, as described above. Alternatively, other indexing elements, such as matched ridges and grooves, or matched slots and pegs, may be used.

The first vessel and the second vessel may be formed of different materials to accommodate different fluids to be contained. For example, aluminum is suitable for storing fuel, but corrodes in contact with urea. Accordingly, the first vessel may be aluminum and the second vessel formed of a metal or polymeric material inert to urea.

BRIEF DESCRIPTION OF THE DRAWINGS

These and other features of the invention will be better understood by reference to the following detailed description read in conjunction with the appended drawings, in which.

DETAILED DESCRIPTION

Figure 1:
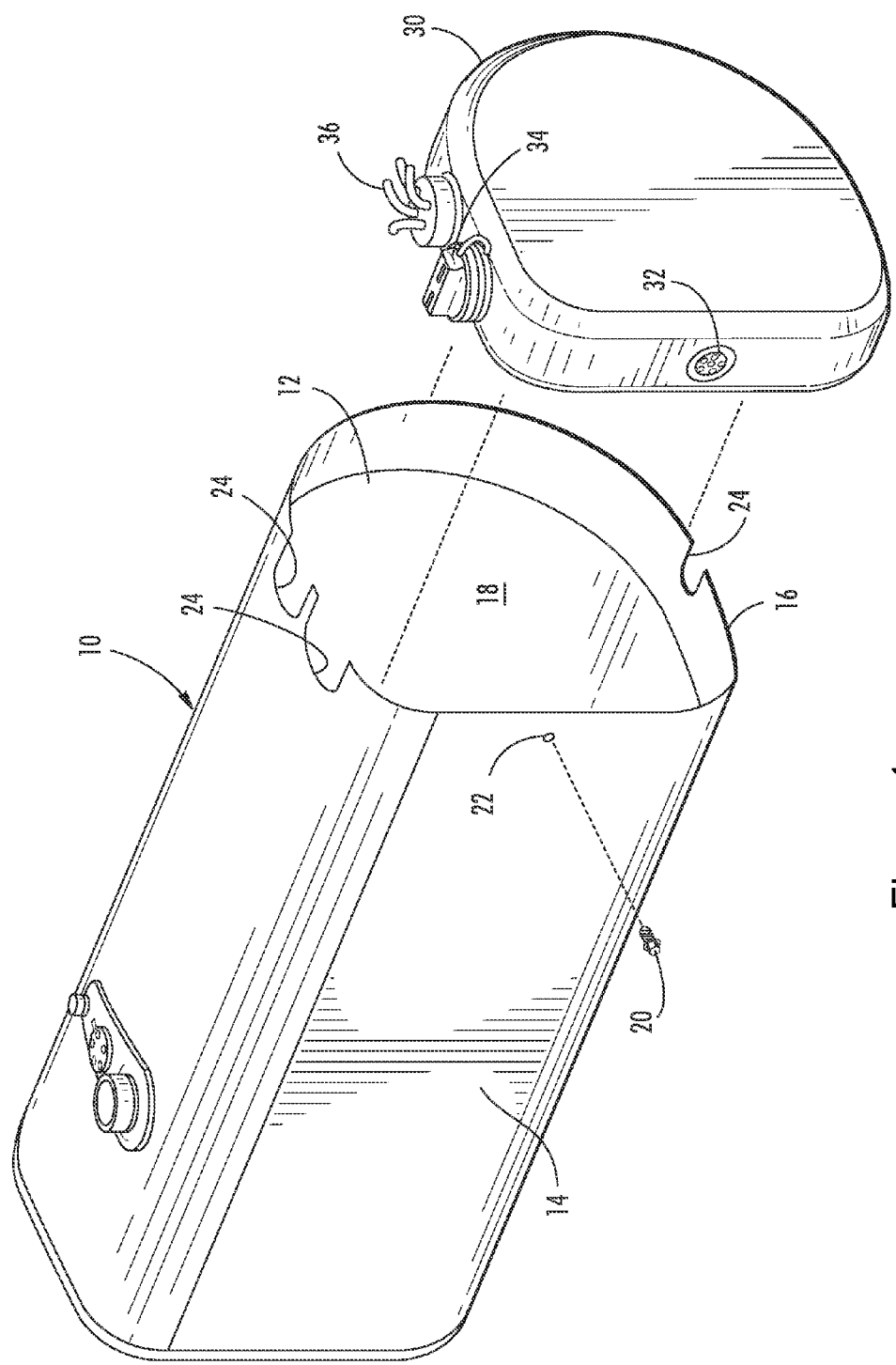
FIG. 1 shows a perspective view of an embodiment of an apparatus in accordance with the invention; and, FIG. 2 shows schematically an alternative embodiment having recesses at each of the opposite ends of the first vessel.

The figure illustrates an embodiment of the invention for containing fuel and an exhaust gas aftertreatment substance for a heavy truck.

The apparatus illustrated in the figure includes a first vessel 10 configured as a fuel tank and a second vessel configured as a urea tank 30. The first vessel 10 includes oppositely disposed end walls, one end wall 12 being visible in the drawing, and a peripheral wall 14 enclosing a space for containing a fluid.

The fuel tank 10 is shown as an elongated cylindrical tank having a "D" profile shape; however, other profiles may be used as appropriate for the vehicle, including, without limitation, rectangular or circular as are known in the fuel tank art. Further, the first vessel need not be elongated; as will be understood, a first vessel of any shape having a peripheral wall that may be adapted as described herein may be used.

According to the invention, the peripheral wall 14 extends beyond the end wall 12 to form a rim 16. The end wall 12 and the rim 16 define a recess 18 which is adapted to receive and support the second vessel 30. The second vessel 30 is shaped to fit in the recess 18. In the illustrated embodiment, the second vessel 30 has a D shaped profile complementary to the profile of the rim 16.

The apparatus also includes devices for securing the second vessel 30 in the recess 18. The device may be a fastener 20 extending through a hole 22 or slot in the rim 16, which engages a mating device 32 provided on the second vessel 30 at an aligned location. The fastener 20 may be an externally threaded device and receiver 32 may be an internally threaded device, for example. Alternatively, a bayonet locking arrangement, or some other suitable device, such as a strap or bar extending across the recess, may be used.

The second vessel 30 has access devices, including a fill neck and cap 34 and a draw cap 36 through which a draw tube and other devices, such as a volume measuring device, a fluid return line, and a temperature measuring device may be communicated into the second vessel. To accommodate the access devices, the rim 16 includes notches or slots 24 to accept the fill neck 34 and draw cap 36. The arrangement of the slots 24 and the access devices also facilitates the proper orientation of the second vessel 30 relative to the recess 18 when installing the second vessel. Although two slots 24 are shown in the illustration, a single slot may be used. The arrangement of the slots 24 on the rim and access devices on the second vessel as orienting devices are advantageous for symmetrical profile vessels, such as circular and square profile vessels. For second vessels in which the access devices do not extend beyond the profile, other indexing or orientation devices may be used, such as a ridge formed in the second vessel with mating grooves formed in the rim, or mating raised bumps and slots, or other complementary shapes.

Figure 2:
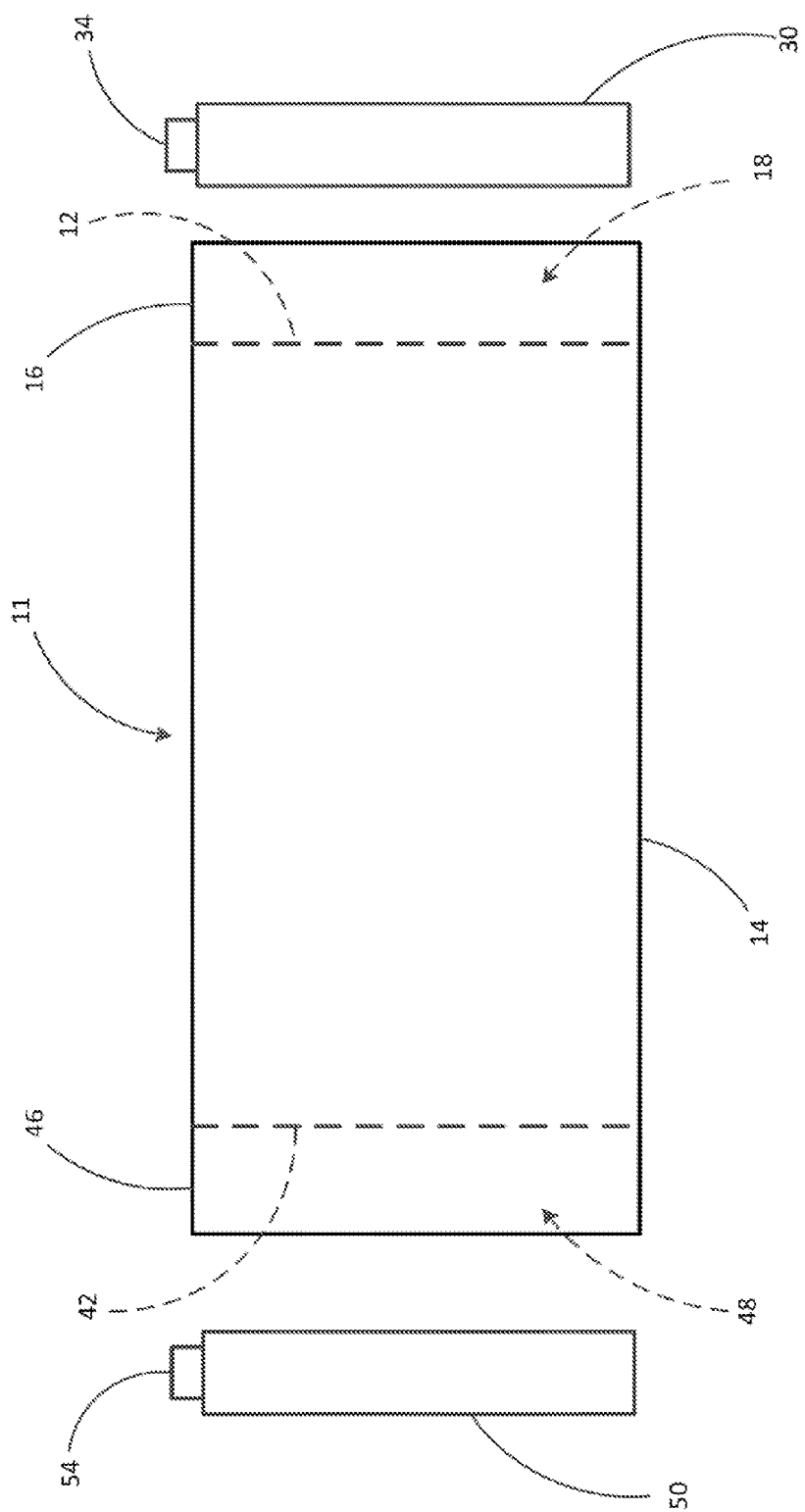

FIG. 2 shows schematically an alternative embodiment of a fuel tank 11, in which the peripheral wall 14 of the first vessel 11 extends beyond a second end wall 42 to provide a second rim 46. The second rim 46 and second end wall 42 define a second recess 48 to support and contain a third vessel 50.

The first vessel 10 and second vessel 30 may be made of a material appropriate for the fluid to be carried. For example, the first vessel 10 as a tank for diesel fuel in the illustrated embodiment may be made of stainless steel or aluminum. The second vessel 30 may be formed of a material suitable for urea, such as a metal or polymeric material that is not corroded by urea.

An advantage of the invention is in using available space on the vehicle frame. A first vessel adapted as a fuel tank in accordance with the invention takes up substantially the same length or only slightly more than a conventional fuel tank.

Another advantage is that, compared to compartmented tanks, the first and second vessels may be made of different materials suitable for the fluids to be contained. A further advantage is that the second vessel may be readily installed and removed as desired.

The invention has been described in terms of preferred principles, embodiments and components. Those skilled in the art will understand that substitutions of equivalents may be made without departing from the scope of the invention as set forth in the appended claims.

What is claimed is:

1. An apparatus for separately containing different fluids, comprising:
    a first vessel having a perimeter wall and at least one end wall defining an internal space, a portion of the perimeter wall extending beyond the at least one end wall to form a rim defining with the at least one end wall a recess; and,
    a second vessel having a shape conforming to the recess, wherein, the second vessel is supported by and fully contained in the recess;
    wherein the first vessel is a fuel tank for a vehicle, and the second vessel is for a fluid other than fuel.

2. The apparatus of claim 1, further comprising at least one device for removably securing the second vessel in the recess.

3. The apparatus of claim 1, wherein said second vessel further comprises at least one component for accessing an interior of the second vessel, and wherein the portion of the perimeter wall of the first vessel forming the rim is shaped with a slot to receive the at least one component.

4. The apparatus of claim 1, wherein the first vessel and the second vessel are formed of different materials.

5. The apparatus of claim 1, wherein the first vessel further comprises a second end wall at an end opposite the at least one end wall, wherein a portion of the perimeter wall extends beyond the second end wall to form a second rim defining with the second end wall a second recess; and, further comprising,
    a third vessel having a shape conforming to the second recess, wherein, the third vessel is fully contained and supported in the second recess.

6. The apparatus of claim 1, wherein the first vessel and the second vessel are complementarily shaped to provide for mutual orientation of the vessels.

7. The apparatus of claim 1, wherein the first vessel and the second vessel include indexing devices for mutual orientation of the vessels.

8. An apparatus for separately containing fuel and an exhaust gas treatment fluid on a vehicle, comprising:
    a first vessel having a perimeter wall and at least one end wall defining an internal space for containing fuel, a portion of the perimeter wall extending beyond the at least one end wall to form a rim defining with the at least one end wall a recess;
    a second vessel having a shape conforming to the recess, wherein, the second vessel is supported and fully contained in the recess; and,
    at least one device for removably securing the second vessel in the recess.

9. The apparatus as claimed in claim 8, wherein said second vessel further comprises at least one component for accessing an interior of the second vessel, and wherein the portion of the perimeter wall of the first vessel is shaped with a slot to receive the at least one component.

10. The apparatus as claimed in claim 8, wherein the first vessel and the second vessel are formed of different materials.

11. The apparatus as claimed in claim 8, wherein the first vessel and the second vessel are complementarily shaped to provide for mutual orientation of the vessels.

* * * * *